Feb. 2, 1960    A. W. VAUDT ET AL    2,923,163
WASHING DEVICE
Filed Dec. 28, 1956

Witness.
A. S. Martin

INVENTORS.
Albert W. Vaudt
Louis H. Vaudt
BY
M. Talbert Dick
ATTORNEY

United States Patent Office 2,923,163
Patented Feb. 2, 1960

2,923,163

WASHING DEVICE

Albert W. Vaudt, Laurens, and Louis H. Vaudt, Slifer, Iowa

Application December 28, 1956, Serial No. 631,266

4 Claims. (Cl. 74—48)

This invention relates to a washing device and more particularly to a small portable machine for washing eggs and like.

Prior to the sale of eggs, they must be washed and cleaned. This entails considerable rather dirty work and time. Most such egg washing is by hand, requiring the individual handling of each egg.

Therefore, the principal object of our invention is to provide a small motorized egg washer.

A further object of this invention is to provide an egg washer that is capable of washing a plurality of eggs simultaneously.

More specifically, the object of our invention is to provide a motorized rotary reciprocating platform upon which a bucket of eggs may be placed.

Still further objects of our invention are to provide an egg washer that is economical in manufacture, durable in use, and refined in appearance.

These and other objects will be apparent to those skilled in the art.

Our invention consists in the construction, arrangements, and combination, of the various parts of the device, whereby the objects contemplated are attained as hereinafter more fully set forth, specifically pointed out in our claims, and illustrated in the accompanying drawings, in which:

Figure 2:
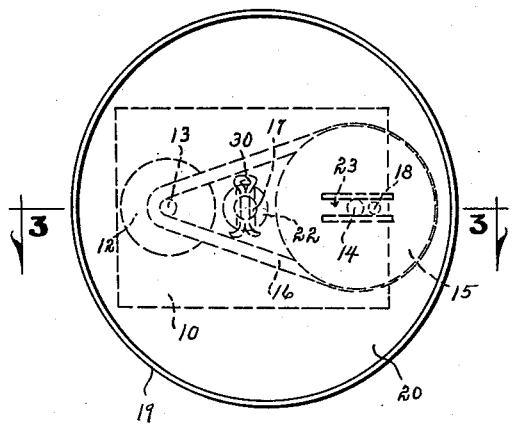
Fig. 2 is an enlarged top plan view of the device.
Figure 4:
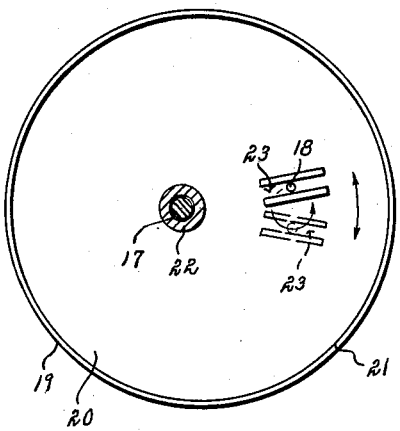
Fig. 4 is a sectional view of the device taken on line 4—4 of Fig. 3, and more fully illustrates the inside bottom of the bucket or like support.
Figure 3:
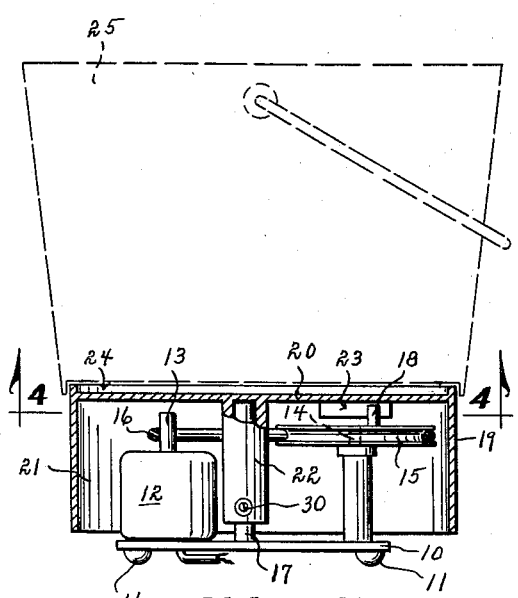
Fig. 3 is a vertical sectional view of our washing machine taken on line 3—3 of Fig. 2, and more fully illustrates its construction.
Figure 5:
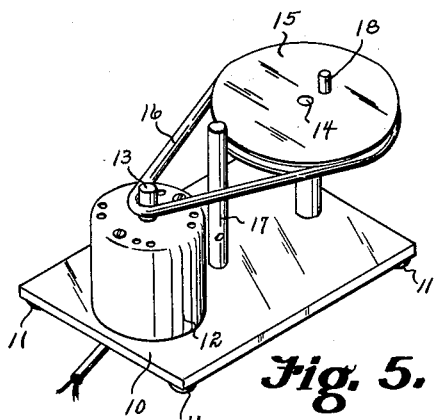
Fig. 5 is a perspective view of the supporting base with the cover platform removed.

In these drawings we have used the numeral 10 to designate a base platform having feet 11 on its bottom and which are preferably resilient such as rubber or like. The numeral 12 designates an electric motor mounted on the top of the base 10 and which is adapted to be placed in electrical communication with a source of electrical energy. The drive shaft of the motor 12 is designated by the numeral 13 and extends upwardly, as shown in Fig. 3. The numeral 14 designates a vertical shaft extending upwardly from the base 10 and positioned a distance from the motor 12. The numeral 15 designates a pulley wheel rotatably mounted on the shaft 14. The numeral 16 designates an endless belt embracing the motor shaft 13 and the pulley wheel 15. The numeral 17 designates a vertical post extending upwardly from the base 10 and positioned between the motor and shaft 14. This post 17 is centrally located on the base 10. The numeral 18 designates a pin extending upwardly from the pulley wheel 15 and off center of the center point of the pulley wheel, as shown in Fig. 5.

Figure 1:
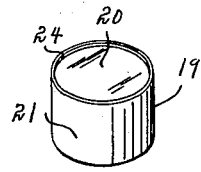
Fig. 1 is a reduced perspective view of our egg or like washer ready for use.

The numeral 19 designates a circular inverted bowl having its top 20 flat and its side wall 21 extending above the top plane of the top 20. The numeral 22 designates a vertically downwardly extending bearing sleeve on the inside bottom center of the bowl 19. In use the inverted bowl is placed loosely over the base platform unit with the bearing sleeve 22 rotatably embracing the post 17 and thus rotatably supporting the inverted bowl, as shown in Fig. 1. The bowl will loosely embrace the mechanism and hide the same. The numeral 23 designates a channel radially arranged on the inside bottom of the inverted bowl and which is engaged by the pin 18. By this arrangement when the motor is running, the belt will rotate the pulley wheel, and the pin 18 will travel in a circular path, thereby moving the radially extending channel laterally forth and back. Inasmuch as the inverted bowl is rotatably mounted and the channel is at a distance from the inverted bowl's center sleeve bearing, the action will be that of rotary reciprocation.

The numeral 25 designates a bucket into which water and the eggs to be washed are placed. While any suitable container may be used and merely set on the top of the inverted bowl and within the flange 24 of its side wall, the bucket shown has a bottom slightly larger in diameter than the upper portion of the inverted bowl and therefore sets down over the inverted bowl and is detachably held thereon as shown. The water in the container or bucket will be effectively agitated, thereby washing the eggs. After the eggs have been cleansed it is merely necessary to lift the container or bucket upwardly and free of the inverted bowl platform.

While we have described our device as adapted particularly for the washing of eggs, obviously it may be used to wash other objects or materials.

To prevent the accidental removal of the inverted bowl from the base unit mechanism the center bearing sleeve may be rotatably secured to the bowl and a pin 30 detachably extended through the sleeve bearing and the post 17. The rotary reciprocation of the sleeve 22 is permitted by making the hole in the sleeve and through which the pin passes of a diameter substantially greater than that of the diameter of the pin.

Some changes may be made in the construction, and arrangement of our washing device without departing from the real spirit and purpose of our invention, and it is our intention to cover by our claims, any modified forms of structure or use of mechanical equivalents which may be reasonably included within their scope.

We claim:

1. In an egg washer, a base platform, feet members on said base platform, a prime mover on said base platform having a drive shaft, a vertical shaft extending upwardly from said base platform, a pulley wheel rotatably mounted on said vertical shaft, an upwardly extending off-center lug pin on said pulley wheel, an endless belt embracing said pulley wheel and the drive shaft of said prime mover for rotating said pulley wheel, a post extending upwardly from said base platform, a top platform adapted to support a container containing eggs and water, a sleeve bearing extending downwardly from said top platform and rotatably embracing said post, and a radially extending channel groove on the bottom of said top platform embracing said lug pin, for causing said top platform to rotatably oscillate.

2. In an egg washer, a base platform, feet members on said base platform, a prime mover on said base platform having a drive shaft, a vertical shaft extending upwardly from said base platform, a pulley wheel rotatably mounted on said vertical shaft, an upwardly extending off-center lug pin on said pulley wheel, an endless belt embracing said pulley wheel and the drive shaft of said prime mover for rotating said pulley wheel, a post extending upwardly from said base platform, a top platform adapted to support a container containing eggs and water, a sleeve bearing extending downwardly from said top platform and rotatably embracing said post, a radially extending channel groove on the bottom of said top platform embracing said lug pin, for causing said top platform to rotatably oscillate, and a skirt on said top platform extending downwardly and loosely embracing said prime mover, said vertical shaft and said endless belt.

3. In an egg washer, a base platform, feet members on said base platform, a prime mover on said base platform having a drive shaft, a vertical shaft extending upwardly from said base platform, a pulley wheel rotatably mounted on said vertical shaft, an upwardly extending off-center lug pin on said pulley wheel, an endless belt embracing said pulley wheel and the drive shaft of said prime mover for rotating said pulley wheel, a post extending upwardly from said base platform, a top platform adapted to support a container containing eggs and water, a sleeve bearing extending downwardly from said top platform and rotatably embracing said post, a radially extending channel groove on the bottom of said top platform embracing said lug pin, for causing said top platform to rotatably oscillate, a skirt on said top platform extending downwardly and loosely embracing said prime mover, said vertical shaft and said endless belt, and a continuous circular upwardly extending retaining flange on said top platform.

4. In an egg washer, a base platform, feet members on said base platform, a prime mover on said base platform having a drive shaft, a vertical shaft extending upwardly from said base platform, a pulley wheel rotatably mounted on said vertical shaft, an upwardly extending off-center lug pin on said pulley wheel, an endless belt embracing said pulley wheel and the drive shaft of said prime mover for rotating said pulley wheel, a post extending upwardly from said base platform, a top platform adapted to support a container containing eggs and water, a sleeve bearing extending downwardly from said top platform and rotatably embracing said post, a radially extending channel groove on the bottom of said top platform embracing said lug pin, for causing said top platform to rotatably oscillate, and a detachable means for limiting the sliding movement of said sleeve bearing relative to said post.

References Cited in the file of this patent

UNITED STATES PATENTS

| | | |
|---|---|---|
| 375,199 | Roe | Dec. 20, 1887 |
| 1,006,831 | Dallemagne | Oct. 24, 1911 |
| 2,104,283 | Webster | Jan. 4, 1938 |
| 2,156,541 | Misenhimer et al. | May 2, 1939 |
| 2,455,089 | Perez | Nov. 30, 1946 |
| 2,542,509 | Goriup | Feb. 20, 1951 |
| 2,560,816 | Petersen | July 17, 1951 |